US010039995B2

(12) United States Patent
Tyni et al.

(10) Patent No.: US 10,039,995 B2
(45) Date of Patent: Aug. 7, 2018

(54) ARRANGEMENT FOR PROVIDING VISUAL EFFECTS AND RELATED METHOD

(71) Applicant: TAIKATEATTERI 13 RY, Helsinki (FI)

(72) Inventors: Tatu Tyni, Aminnefor (FI); Jani Pulkkinen, Espoo (FI); Petri Mikkonen, Tampere (FI)

(73) Assignee: D.I.E TECH OY, Helsinki (FI)

( * ) Notice: Subject to any disclaimer, the term of this patent is extended or adjusted under 35 U.S.C. 154(b) by 0 days.

(21) Appl. No.: 15/515,692

(22) PCT Filed: Oct. 1, 2015

(86) PCT No.: PCT/FI2015/050652
§ 371 (c)(1),
(2) Date: Mar. 30, 2017

(87) PCT Pub. No.: WO2016/051018
PCT Pub. Date: Apr. 7, 2016

(65) Prior Publication Data
US 2017/0304742 A1    Oct. 26, 2017

(30) Foreign Application Priority Data

Oct. 2, 2014  (FI) .................................... 20145860

(51) Int. Cl.
*A63J 5/02*     (2006.01)
*G03B 17/54*   (2006.01)
(Continued)

(52) U.S. Cl.
CPC ................ *A63J 5/02* (2013.01); *G03B 17/54* (2013.01); *H05B 37/02* (2013.01); *G01J 2009/006* (2013.01)

(58) Field of Classification Search
CPC .. A63J 5/02; G03B 17/54; H05B 37/02; G01J 2009/006
See application file for complete search history.

(56) References Cited

U.S. PATENT DOCUMENTS 5,023,709 A    6/1991   Kita et al.
6,079,862 A    6/2000   Kawashima et al.
(Continued)

FOREIGN PATENT DOCUMENTS

CN    103295428 A    9/2013
EP    0 447 610 A1   9/1991
(Continued)

OTHER PUBLICATIONS

"AAXA L1 Laser Pico Projector—LCoS Based Hand-held Pocket Projector—Laser Micro Projector", Retrieved from the Internet <URL:https:// web.archive.org/web/20140904195631>.
(Continued)

*Primary Examiner* — Michael Dennis
(74) *Attorney, Agent, or Firm* — Young & Thompson (57) ABSTRACT

An arrangement for providing visual effects including light emitting members attached to a target, an imaging unit for locating the light emitting members, a computing unit for receiving real-time location information data from the imaging unit and controlling a laser projector based on the received location information data, a laser projector projecting a laser beam responsive to control information provided by the computing unit, and a partially reflecting mirror reflecting the projected laser beam with respect to the light emitting members towards and/or in the vicinity of the light emitting members and passing the light from the light emitting members to the imaging unit. Related method is presented.

20 Claims, 4 Drawing Sheets

(51) Int. Cl.
*H05B 37/02* (2006.01)
*G01J 9/00* (2006.01)

(56) References Cited

U.S. PATENT DOCUMENTS

| | | | |
|---|---|---|---|
| 2003/0122780 A1* | 7/2003 | Hendriks | G06F 3/03542 345/156 |
| 2008/0225372 A1 | 9/2008 | Hewlett et al. | |
| 2010/0200753 A1* | 8/2010 | Westaway | F21V 17/02 250/338.1 |
| 2011/0148757 A1 | 6/2011 | Lathrop et al. | |
| 2011/0285854 A1* | 11/2011 | LaDuke | G01S 11/00 348/169 |
| 2012/0128330 A1* | 5/2012 | Mahdavi | G06K 9/2018 386/252 |
| 2013/0250184 A1* | 9/2013 | Leclerc | A63J 5/02 348/744 |

FOREIGN PATENT DOCUMENTS

| | | |
|---|---|---|
| EP | 0 484 160 A2 | 5/1992 |
| EP | 1 107 052 A1 | 6/2001 |
| WO | 2008/128636 A2 | 10/2008 |

OTHER PUBLICATIONS

International Search Report, dated Jan. 14, 2016, from corresponding PCT application.
FI Search Report, dated Mar. 18, 2015, from corresponding FI application.
FI Office Action, dated Feb. 17, 2016, from corresponding FI application.

* cited by examiner

ARRANGEMENT FOR PROVIDING VISUAL EFFECTS AND RELATED METHOD

FIELD OF THE INVENTION

Generally the present invention pertains to visual effects. In particular, the present invention concerns an arrangement for visual effects and related methods, preferably used for live performances such as theater or illusion performances.

BACKGROUND

For a long time has visual effects been used in movies, video games and other recorded or non-live entertainment material. Visual effects may be used to create imaginary events. Lately, there has been some development for producing visual effects for live performances, such as theater and illusion shows, as well. However, the effects that can be generated by these arrangements fall far behind the ones audiences are accustomed to see in TV and movies.

Projectors may be used in theater settings to project images or videos on the back wall, creating changing scenery, for example. A different set of lighting is also normally used in live shows to create some visual effects. For example, light settings can be used to change the atmosphere by dimming and brightening different parts of the stage area. Spotlights are also commonly used to highlight areas or actors. Some spotlight arrangements may even have the function to follow actors moving on the stage.

Amongst other deficits, prior art solutions for live performances have problems with timing and accuracy. The known arrangements are not capable of keeping up with moving objects in real-time. Projectors or light settings set to follow a moving object, such as an actor on stage, tend to be for the human eye some fractions behind the target. This is both annoying for the audience, but also restricts performers of creating more outstanding show experiences. Performances requiring exact timing, such as illusion tricks, lose their significance without real-time effects. With known arrangements it's especially difficult to create visual effects on randomly moving objects, such as actors on stage, whose distance between the projecting unit changes constantly.

Projected images and videos with conventional projectors tend to need a flat surface such as a screen for the audience to be able to view the projections properly. The known arrangements will also need a close projecting range for the projections to stay sharp. This will set some restrictions on the mounting of the projector and the design of the space.

SUMMARY OF THE INVENTION

The objective is to at least alleviate one or more problems described hereinabove not yet satisfactorily solved by the known arrangements, and to provide a feasible solution for real-time visual effects for live performances. One objective is to provide an arrangement for providing visual effects that provides accurate visual figures on moving targets regardless the moving targets' constantly varying distance to the projecting unit.

The aforesaid objective is achieved by the embodiments of an arrangement and method in accordance with the present invention.

In one aspect of the present invention an arrangement for providing visual effects comprises a number of light emitting members, preferably infrared light, attached to a target, at least one imaging means for locating said light emitting members, a computing unit for receiving real-time location information data from the imaging means and controlling a laser projector based on the received location information data, at least one laser projector, projecting a laser beam responsive to control information provided by the computing unit, and a partially reflecting mirror reflecting the projected laser beam with respect to the light emitting members towards and/or in the vicinity of the light emitting members and passing the light from the light emitting members to the imaging means or a partially reflecting mirror reflecting the light from the light emitting members to the imaging means and passing the projected laser beam from the laser projector.

In one embodiment the arrangement comprises input means to obtain figure data for providing visual figures with the light projecting unit, e.g. laser projector, in the projected location.

In another, either supplementary or alternative, embodiment the light emitting members are infrared light-emitting diodes (LEDs). Alternatively, other than infrared light emitters may be used. Different light or wave may be used, preferably light or wave differentiating from the ambient light so that it may be captured with imaging means.

In a further, either supplementary or alternative, embodiment the projected light is configured to follow the light emitting members with a laser projector by controlling the laser beam with at least two mirrors.

In a further, either supplementary or alternative, embodiment visual figures are created in the projected location with a laser projector by controlling the laser beam with at least two mirrors.

In a further, either supplementary or alternative, embodiment the at least two mirrors for following the light emitting members and the at least two mirrors for creating visual figures in the projected location are the same mirrors.

In a further, either supplementary or alternative, embodiment the imaging means and the projecting unit have shared optics. In one embodiment the imaging means and the projecting unit are aligned on the same optical axis.

In a further, either supplementary or alternative, embodiment the light emitting members are modulated with an individual frequency identified by the imaging means. In a further, either supplementary or alternative, embodiment the modulation includes a DC offset level keeping the light emitting members within the radiation intensity range in which the radiation is detected by the imaging means.

In a further, either supplementary or alternative, embodiment the imaging means for locating light emitting members are at least one high-speed camera, preferably capturing at least 200 frames per second. The imaging means may comprise filters to block ambient light. In an embodiment where infrared light is used in the light emitting members, infrared filters may be used to block other than infrared light. Additionally or alternatively, the imaging means may comprise other filters, such as polarizing filters to block reflections.

In a further, either supplementary or alternative, embodiment the target is a moving object. Additionally or alternatively the target may be stationary. In a further, either supplementary or alternative, embodiment the target's distance to the laser projector varies.

In a further, either supplementary or alternative, embodiment the location information data includes coordinates.

In a further, either supplementary or alternative, embodiment the laser projector comprises one laser light source for single color projection.

In a further, either supplementary or alternative, embodiment the laser projector comprises three laser light sources, preferably RGB (Red, Green and Blue), for multicolor projection.

In a further, either supplementary or alternative, embodiment the light projecting unit is located at least 8 meters from the target. In another embodiment the light projecting unit is configured to work up to at least 50 meters from the target.

In a further, either supplementary or alternative, embodiment the arrangement comprises at least two or three imaging means.

In a further, either supplementary or alternative, embodiment the arrangement comprises at least two or three light projecting units.

In a further, either supplementary or alternative, embodiment the arrangement is connected to a DMX (Digital Multiplex) controller.

In another aspect, a method for providing visual effects utilizing an arrangement, comprises
providing a number of light emitting members,
detecting a light pulse with at least one imaging means,
processing and communicating location information data with said imaging means,
receiving and processing the location information data with a computing unit, and
controlling at least one laser projector with said computing unit based on the said received location information data and creating visual figures in the projected location.

The utility of the present invention follows from a plurality of issues depending on each particular embodiment.

Embodiments of the invention may be utilized in live performances. Such performances may be theater drama, illusion performances and musicals, for example and may take place in a conventional theater setting including an audience section and stage area.

Light emitting members used in embodiments of the invention are easily attachable to different targets. Imaging means used by embodiments of the invention may provide accurate enough location information to the arrangement so that the projections are following the targets for the human eye in real-time.

The projecting part of embodiments of the invention may be placed on a longer distance from the projected target, such as the back section of a theater setting. Figures projected by embodiments of the invention may be sharp and easily viewed by the audience, even when projected from longer distances.

The placement of the imaging means, projecting unit and partially reflecting mirror may allow accurate projections on the target. The varying distance of the target may not affect the accuracy.

Embodiments of the arrangements may provide means for live performers to provide more outstanding shows. The arrangement may provide a wide range of new opportunities for illusion performers. The arrangement may be easily combined with other illusion techniques. The arrangement may be utilized for tricks such as making a person seem to disappear on stage or changing an outfit on a person, for example.

Some embodiments of the invention may be utilized in advertisement or other similar environment where real-time effects may be projected on moving objects. For example, embodiments of the invention may be utilized in a horse track competition where visual effects are projected on the racing horses. In a similar way race cars may be projected with visual effects by embodiments of the invention.

The expression "a number of" refers herein to any positive integer starting from one (1), e.g. to one, two, or three.

The expression "a plurality of" refers herein to any positive integer starting from two (2), e.g. to two, three, or four.

Different embodiments of the present invention are disclosed in the dependent claims.

BRIEF DESCRIPTION OF THE RELATED DRAWINGS

Next the invention is described in more detail with reference to the appended drawings in which.

DETAILED DESCRIPTION OF THE EMBODIMENTS

Figure 1:
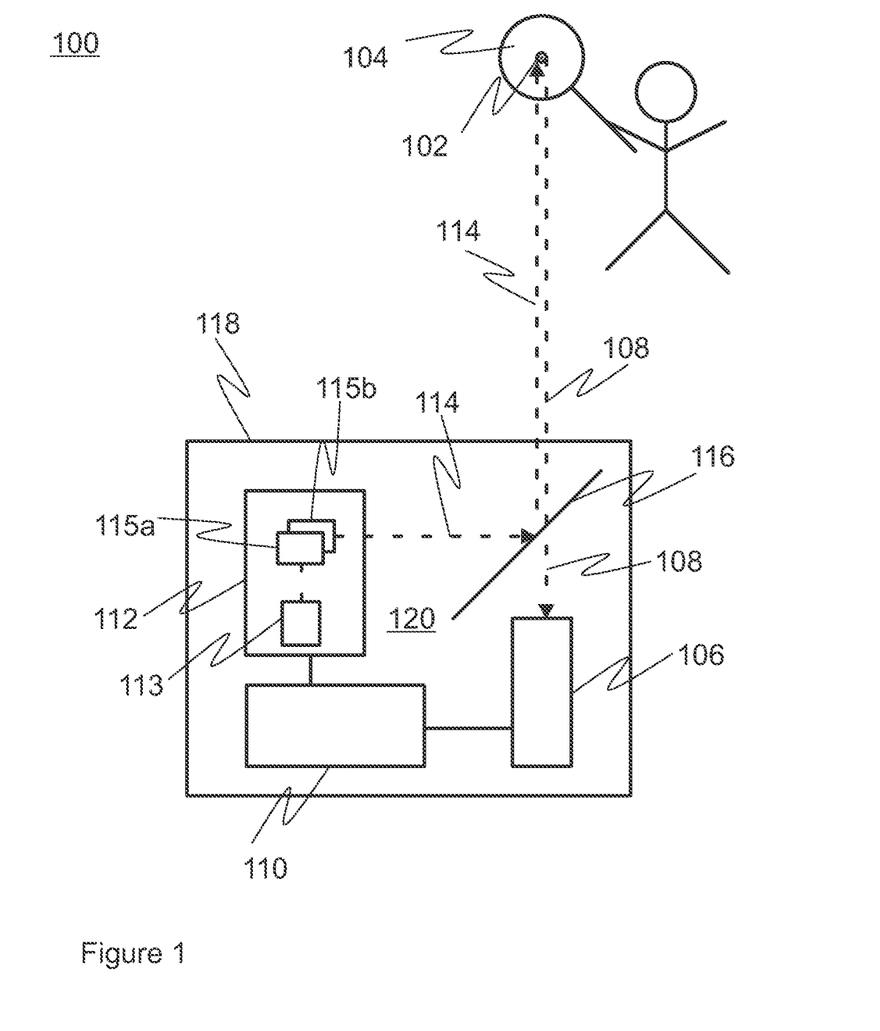
FIG. 1 illustrates an embodiment of an arrangement in accordance with the present invention with emphasis on the related hardware.

FIG. 1 illustrates an embodiment of an arrangement 100 in accordance with the present invention.

The arrangement 100 comprises at least one light emitting member 102 attached to a target 104. The light emitting members may, preferably, be light sources with a wavelength differing from the ambient light. The light emitting members 102 may differ from the ambient light by other means as well, in a way that they can be distinguished and located by imaging means 106. Infrared light members may be used in a preferred embodiment of the invention. An infrared light emitting member may be an infrared light emitting diode (LED), for example.

LEDs with too narrow cones may be hard to detect by the imaging means. For example, if the LEDs are attached to a person and the person turns slightly away from the imaging means, the connection might get lost. On the other hand, too wide cones might make it difficult to provide an accurate projection as the light from the LEDs may reflect from the surrounding material, e.g. a person's clothing. A preferred width of a cone may be between 20° and 100°, a more preferred between 40° and 80° and most preferred between 50° and 70°.

A target 104 may be an actor performing on a stage, a prop or a flying object, for example. The flying object may be a radio-controlled helicopter or other flying aircraft which may be utilized in a drama performance for flying objects in the air. A target may be any object, moving or stationary, where a light emitting member, such as an infrared LED, is attachable.

When the target 104 moves, the projected light 114 follows the light emitting member 102. The target may move sideways or in depth, away and towards the projecting unit 112 and the light beam 114 may follow accurately. In other words, the distance between the target and the projecting unit may vary.

Light emitting members may be attached to physically separate targets. For example two actors on a stage may have own light emitting members and light from one light projecting unit may be projected towards them.

The arrangement comprises at least one imaging means 106 for locating said light emitting members 102. The imaging means 106 may comprise at least one camera, preferably a high-speed camera, preferably capturing at least 200 frames per second. The imaging means 106 may be placed and calibrated so that it captures the whole area where the target 104 will be moving. For example, the imaging means may be covering a whole stage area of a theater setting. When the target 104 moves and the light emitting member 102 changes location, the imaging means 106 captures the location information in real-time. The camera may be a high-resolution camera.

The imaging means 106 may comprise IR (infrared) filters to block, preferably completely, light with other wavelengths and pass the infrared light 108 from the light emitting members 102. The imaging means 106 may also comprise polarizing filters to block light reflections.

The imaging means 106 captures location information data based on the location of the light emitting members 102. Captured location information data may include coordinates such as Cartesian coordinates and/or image data from which location may be derived. The location information data is processed and communicated to a computing unit 110.

A computing unit 110 is configured to receive and process information location data from the imaging means 106. The computing unit may be a separate computer or an integrated unit comprising processors, memory and/or UI (user interface). User interface may include input means, such as keyboard, mouse and/or touch-surface, and/or output means such as a display.

The computing unit 110 is configured to control the light projecting unit 112. The light projecting unit 112 is preferably a laser projector. The projector may comprise a laser light source 113 with one laser light source for single color projection or three laser light sources for multicolor projection. The laser beam 114 may be controlled with reflecting mirrors 115a, 115b. The light projecting unit 112 may comprise at least two closely placed mirrors 115a, 115b driven by galvanometers or electric motors for example, configured to receive control information from the computing unit 110. The two reflecting mirrors 115a, 115b may be configured to create visual figures in the projected location by controlling the laser beam.

The arrangement 100 comprises a partially reflecting mirror 116 configured to reflect the laser beam 114 towards and/or with respect to the light emitting member 102 and passing the IR light 108 from the light emitting members 102 to the imaging means 106. The partially reflecting mirror 116 may be substantially in a 45-degree angle towards the light projecting unit 112 and/or the imaging means 106. The partially reflecting mirror 116 may be configured to reflect light with respect to the wavelength of the light, for example reflecting the light from the light projecting unit 112 and passing light from the light emitting member 102. The partially reflecting mirror may be a beam splitter, one-way mirror or filter mirror, for example.

The laser beam may not fall off the target even though the target moves in depth, towards and/or away from the projector.

The light projecting unit 112 and the imaging means 106 may be substantially perpendicular towards each other.

In some embodiments of the arrangement, the imaging means and the projecting unit may be located on substantially opposite places than presented in FIG. 1. The imaging means may be located where the light projecting is located, faced more sideways to the target, and respectively the light projecting unit may be located where the imaging means are located, faced more towards the target. Thereby, the partially reflecting mirror may be configured to reflect the light from the light emitting members to the imaging means and configured to pass the light from the light projecting unit.

The arrangement 100 may comprise input means to obtain figure data, which may be replicated and projected towards the light emitting members 102 attached to a target 104. The arrangement 100 may comprise conventional means, such as dedicated software for creating visual figures. The computing unit 110 may comprise software for drawing figures for example. The figures may be stationary such as letters or symbols or animations such as a flying fairy or running animal, for example. Figures may also be downloaded and/or uploaded from other sources. In some embodiments the figures may be drawn with a tablet or similar touch surface device and transferred by conventional data transfer means using wireless and/or wired connections such as USB or internet connections.

The imaging means 106, computing unit 110, light projecting unit 112 and partially reflecting mirror 116 may be a unitary entity referred to hereinafter as the device 120. In some embodiments, the parts may be placed inside of a casing 118. In alternative embodiments, some parts may be separate. For example, the computing unit may be a computer outside the casing. In alternative embodiments, there might not be any physical casing.

In the embodiment disclosed in FIG. 1, a user such as an actor, assistant or illusionist is holding and moving the target 104. The reflected light beam 114 follows the light emitting member 102 according to the movements provided by the user.

A preferred embodiment comprises imaging means 106 capturing over 200 frames per second. Imaging means capturing over 200 frames per second may provide accurate enough location data to the computing unit 110 for the laser beam to follow the light emitting members 102 in real-time for the human eye. In some embodiments, the captured location data may be communicated raw and unprocessed, alternatively in bursts, to the computing unit, for enhancing accuracy of the laser beam.

As is understood by a person skilled in the art, the arrangement is not restricted solely to imaging means capturing at least 200 frames per second. Some embodiments of the arrangement may work with imaging means capturing 100 frames per second or less, such as 50 frames per second. Some embodiments may utilize imaging means capturing considerably more than 200 frames per second, such as at least 500, 1000 or 2000 frames per second.

The device 120 may be placed in the back section of a theater setting, behind the audience. The light may be projected over the audience to the stage. Projections may be done on top of the audience as well. The figures projected with a laser projector may stay sharp from longer distances. In some embodiments the light projecting unit may be located over 8 meters away from the light emitting members, for example. As is understood by a person skilled in the art, in some embodiments of the arrangement, the light projecting unit may be located less than 8 meters away from the light emitting members.

In some embodiments, the device 120 may be less than 2 meters away from the light emitting members. The imaging means 106 may be configured to capture location information data from a close range, by adjusting camera optics for example.

Figure 2:
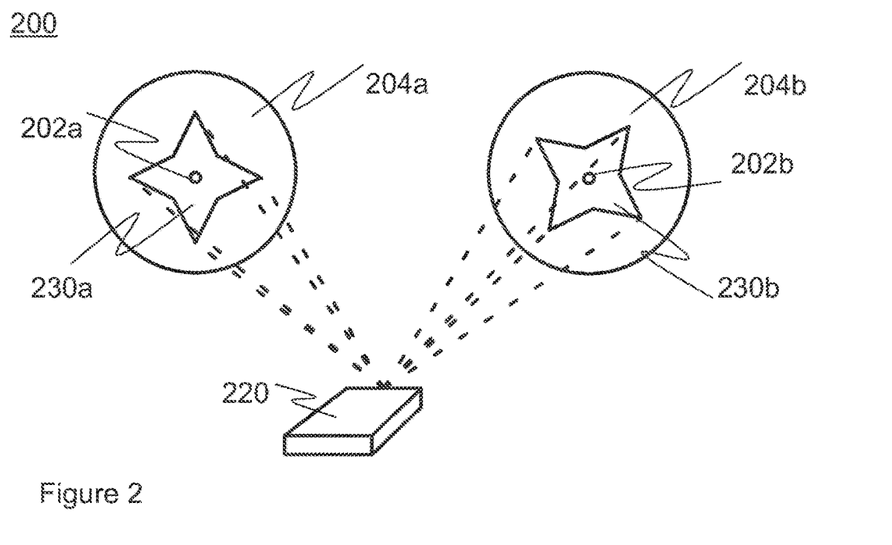
FIG. 2 illustrates an embodiment of an arrangement in accordance with the present invention disclosing the movement of a target.

FIG. 2 discloses an embodiment of an arrangement 200 in accordance with the present invention disclosing the movement of a target 204. Target 204a represents the target in its first position. Target 204b represents the target in its second position. The target 204a in its first position comprises a light emitting member 202a. A device 220 is projecting a star like figure 230a on the target 204a. The center of the figure 230a may be located on the light emitting member 202a. The target may move to its second position 204b, the center of the figure 230b staying on the light emitting member 202b.

In some embodiments of the present invention the projections may turn off when the light emitting members are not in the sight of the imaging means. Alternatively, the projections may stay in the location where the connection was lost.

For example, in FIG. 2 the light emitting member 202a may be turned off or alternatively the target 204a may be turned over so that the imaging means in device 220 loses the location of light emitting member 202a. Now the projection may be turned off. The same light emitting member or another one 202b may be turned on in a different location and the projection is turned on and figure 230b is projected on the target 204b.

Figure 3:
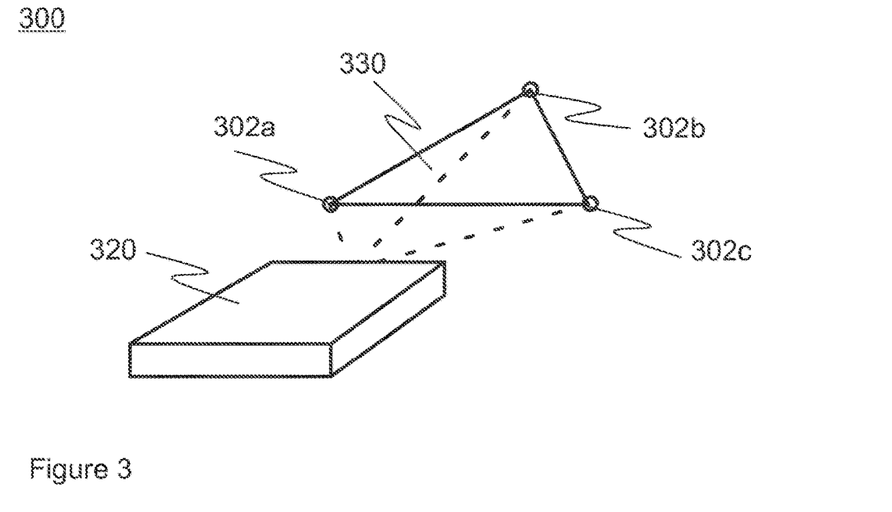
FIG. 3 illustrates an embodiment of an arrangement in accordance with the present invention with multiple light emitting members.

FIG. 3 discloses an embodiment of an arrangement 300 in accordance with the present invention with multiple light emitting members 302a, 302b and 302c. The arrangement 300 comprises three light emitting members 302a, 302b and 302c. The light emitting members may be attached to one target or several physically separate targets. The device 320 may be configured to obtain location data substantially simultaneously from the three light emitting members 302a, 302b and 302c. The device 320 may provide a visual figure 330 by utilizing the location information data from all the light emitting members 302a, 302b and 302c. In FIG. 3, the disclosed visual figure 330 resembles a triangle, where the projected light connects the corners of the triangle provided by the light emitting members 302a, 302b and 302c. When the light emitting members 302a, 302b and 302c move in relation to one another, figure 330 changes in shape and size.

Light emitting members 302a, 302b and 302c may be modulated to have an individual frequency so that the light emitting members may be distinguished by the imaging means. The imaging means may then send individual location information data to the computing unit. Preferred projections may now be executed.

Different light emitting members may be modulated with a sine wave signal, for example. The sine wave modulation may drop the radiation intensity momentarily under the minimum level detected by the imaging means. Therefore, the light emitting members may be driven with a signal including DC offset level, keeping the radiation intensity of the light emitting members within the range in which the radiation is detected by the imaging means. However, the DC offset level may be low enough, not causing the light emitting members and/or the imaging means to saturate. For example, the light emitting members may be driven with a signal according to the following formula:

$$F(t) = A1 + A2 * \sin(2*\pi*f*t),$$

wherein
A1 = DC level
A2 = sine level
A1 >= minimum identification level + A2
A2 <= maximum level − A1
f = frequency
t = time.

The device 320 may also be configured to provide separate figures at each light emitting member 302, 302b and 302c. Alternatively, the device 320 may utilize the light emitting members 302, 302b and 302c as reference points and provide the projected figure within these points, for example.

Figure 4:
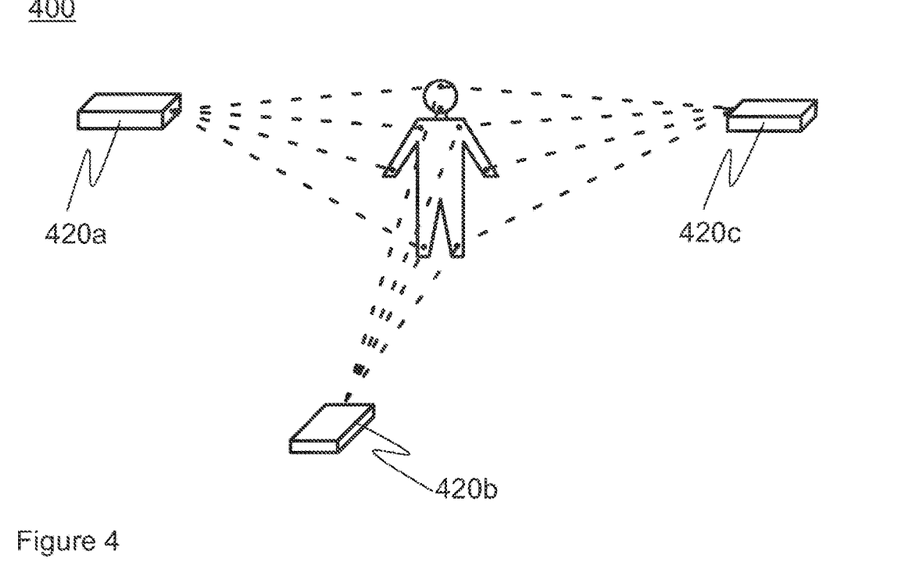
FIG. 4 illustrates an embodiment of an arrangement in accordance with the present invention with multiple light projecting units.

FIG. 4 discloses an embodiment of an arrangement 400 according to the present invention with a plurality of devices 420a, 420b and 420c. The devices 420a, 420b, 420c may be configured to communicate together, providing a unitary visual figure, for example.

All the devices 420a, 420b and 420c may comprise an imaging means, a computing unit, a light projecting unit and a partially reflecting mirror. Alternatively, there might only be one computing unit, receiving location information from all the devices separately and controlling the light projecting units together. The computing unit may be located separately or integrated to one of the devices.

As illustrated in FIG. 4, the devices 420a, 420b and 420c may be located one in the front and two substantially on the side of the projected area. In some embodiments the devices may be closer to each other in a circle format, for example. With the use of multiple light projecting units more complex figures may be provided. When projecting on a 3D object (e.g. a person) the use of multiple devices may assist in covering the whole object. Additionally, when the target moves so that some device(s) loses the sight of some light emitting member(s), the other device(s) may be configured to provide the missing projections.

Figure 5:
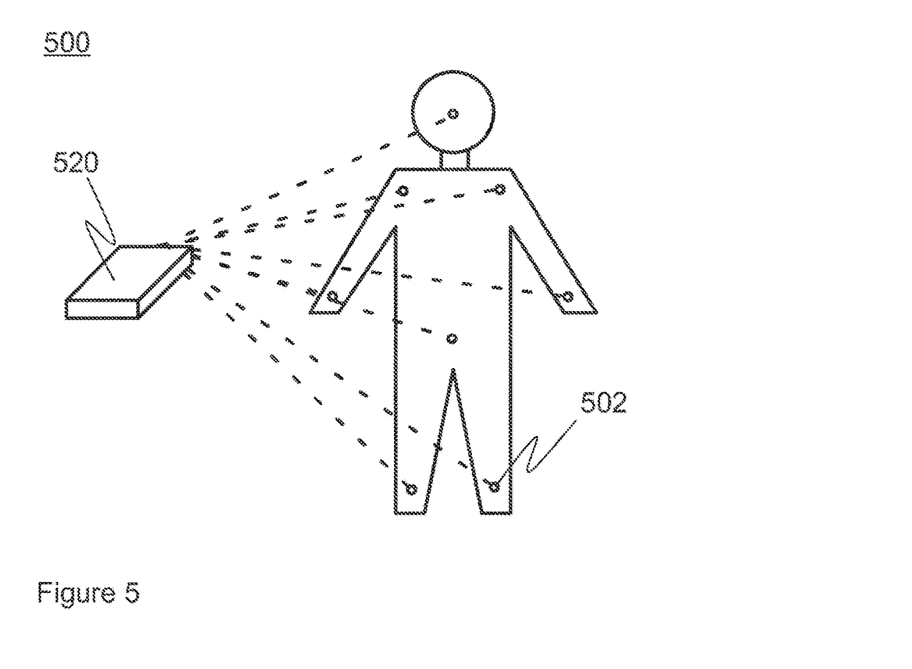
FIG. 5 illustrates an embodiment of an arrangement in accordance with the present invention disclosing a plurality of light emitting members attached to a person.

FIG. 5 illustrates an embodiment of an arrangement 500 according to the present invention with a plurality of light emitting members 502 attached to a person. The device 520 may obtain location information from all the light emitting members 502 and project a visual figure on the person so that the figure is located on the person. Eight light emitting members attached correctly on a person may be enough to provide an accurate projection on the person.

Embodiments of the arrangement according to the present invention provide visual figures and/or effects in real-time. As is understood by a person skilled in the art, the figures and/or effects may change in real-time, as well. For example, the projected figure may be an animation. For more professional use, some embodiments of the arrangement may be connected to a DMX (Digital Multiplex) controller, utilized together with other lighting and effects.

Figure 6:
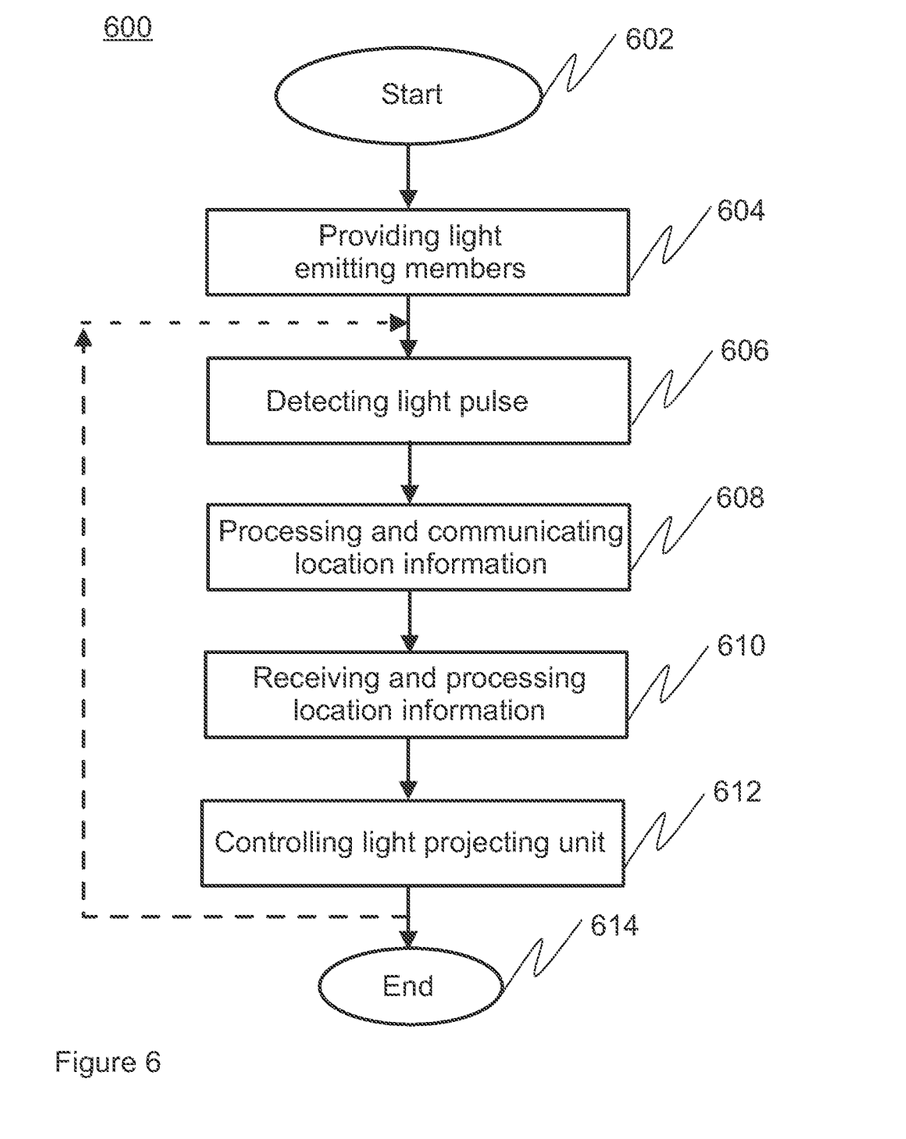
FIG. 6 is a flow diagram disclosing an embodiment of a method in accordance with the present invention.

FIG. 6 includes, at 600, a flow diagram of an embodiment of the method according to the present invention for providing visual figures on a, optionally moving, target.

At 602, method start-up, preparative actions may take place. This step may comprise setting up the needed parts or devices for executing the method. The step may comprise assembling or setting up the imaging means and projecting unit and aligning them with a partially reflecting mirror according to the arrangement of the present invention. The step may also comprise setting up a computing unit and installing or configuring the related software and hardware. The step may also comprise communicating figure data of the projected figures to the computing unit.

At 604, light emitting members are provided. This step may comprise attaching one or multiple light emitting members to one or multiple targets. The attached light emitting members may be infrared LEDs. The step may also include forming a light pulse by turning on the attached light emitting members.

At 606, the light pulse is detected. This step may comprise the target with the attached light emitting members moving in the sight of the imaging means. For example an actor with attached LEDs may walk onto a stage area. The light pulse may be detected through a partially reflecting mirror. Alternatively the light may be detected via a partially reflecting mirror.

At 608, the location information data is processed and communicated. The imaging means may process the location information data from the detected light emitting members and communicate the location information data to the computing unit. Processed and communicated location information data may comprise coordinates.

At 610, location information data is received and processed. This step may comprise the computing unit to receive and process the location information data communicated by the imaging means.

At 612, the light projecting unit is controlled. The light projecting unit is controlled by the computing unit. Based on the received location information and figure data, the computing unit may control the projecting unit to project visual figures with respect to the light emitting members. The step may comprise reflecting the projected light via a partially reflecting mirror. Alternatively, the step may comprise projecting the light through a partially reflecting mirror. Two reflecting mirrors driven by galvanometers or electric motors may be connected to the computing unit. Visual figures may be created in the projected location by controlling the two reflecting mirrors.

As is understood by a person skilled in the art, some steps of the method are typically repetitive and responsive to e.g. movement of the light emitting member. The dotted arrowed line represents the repetitive nature of some of the steps in the method. As a target moves and the location of the light emitting members changes, the imaging means detects the light emitting members and new location information data is processed and communicated further by the imaging means.

At 614, method execution is ended. The step may comprise turning of the different parts of the arrangement.

Consequently, a skilled person may on the basis of this disclosure and general knowledge apply the provided teachings in order to implement the scope of the present invention as defined by the appended claims in each particular use case with necessary modifications, deletions, and additions, if any.

The invention claimed is:

1. An arrangement (100, 200, 300, 400, 500) for providing visual effects comprising
a number of light emitting members (102, 202, 302, 502) attached to a target (104, 204),
at least one imaging means (106) for locating said light emitting members (102, 202, 302, 502),
a computing unit (110) for receiving real-time location information data from the imaging means (106) and controlling a laser projector (112) based on the received location information data,
at least one laser projector, projecting a laser beam responsive to control information provided by the computing unit (110), and
a partially reflecting mirror (116) reflecting the projected laser beam (114) with respect to the light emitting members (102, 202, 302, 502) towards and/or in the vicinity of the light emitting members (102, 202, 302, 502) and passing the light (108) from the light emitting members (102, 202, 302, 502) to the imaging means (106) or a partially reflecting mirror (116) reflecting the light from the light emitting members (102, 202, 302, 502) to the imaging means (106) and passing the projected laser beam from the laser projector (112);
wherein the light emitting members (102, 202, 302, 502) are modulated with an individual frequency identified by the imaging means (106); and
wherein the modulation includes a DC offset level keeping the light emitting members (102, 202, 302, 502) within the radiation intensity range in which the radiation is detected by the imaging means (106).

2. The arrangement (100, 200, 300, 400, 500) of claim 1, wherein the arrangement (100, 200, 300, 400, 500) comprises input means to obtain figure data for providing visual FIGS. 230, 330) with the laser projector (112) towards and/or in the vicinity of the light emitting members (102, 202, 302, 502).

3. The arrangement (100, 200, 300, 400, 500) of claim 1, wherein the projected light is configured to follow the light emitting members with a laser projector by controlling the laser beam with at least two mirrors.

4. The arrangement (100, 200, 300, 400, 500) of claim 1, wherein visual figures are created towards and/or in the vicinity of the light emitting members (102, 202, 302, 502) with a laser projector by controlling the laser beam with at least two mirrors.

5. The arrangement of claim 3, wherein the at least two mirrors for following the light emitting members also create visual figures towards and/or in the vicinity of the light emitting members (102, 202, 302, 502).

6. The arrangement (100, 200, 300, 400, 500) of claim 1, wherein the imaging means and the laser projector are aligned on the same optical axis.

7. The arrangement (100, 200, 300, 400, 500) of claim 1, wherein the light emitting members (102, 202, 302, 502) are infrared light-emitting diodes (LEDs).

8. The arrangement (100, 200, 300, 400, 500) of claim 1, wherein the imaging means (106) for locating light emitting members (102, 202, 302, 502) are at least one high-speed camera capturing at least 200 frames per second.

9. The arrangement (100, 200, 300, 400, 500) of claim 1, wherein the imaging means (106) comprises infrared filters to block other than infrared light.

10. The arrangement (100, 200, 300, 400, 500) of claim 1, wherein the imaging means (106) comprises polarizing filters to block reflections.

11. The arrangement (100, 200, 300, 400, 500) of claim 1, wherein the target (104, 204) is a moving object.

12. The arrangement (100, 200, 300, 400, 500) of claim 1, wherein the target's distance to the laser projector varies.

13. The arrangement (100, 200, 300, 400, 500) of claim 1, wherein the location information data includes coordinates.

14. The arrangement (100, 200, 300, 400, 500) of claim 1, wherein the laser projector comprises one laser light source for single color projection or three laser light sources, for multicolor projection.

15. The arrangement (100, 200, 300, 400, 500) of claim 1, wherein the laser projector (112) is located at least 8 meters from the target (104, 204).

16. The arrangement (100, 200, 300, 400, 500) of claim 1, wherein the laser projector is configured to work up to at least 50 meters from the target.

17. The arrangement (100, 200, 300, 400, 500) of claim 1 comprising at least two or three imaging means (106).

18. The arrangement (100, 200, 300, 400, 500) of claim 1 comprising at least two or three laser projectors (112).

19. The arrangement (100, 200, 300, 400, 500) of claim 1, wherein the arrangement (100, 200, 300, 400, 500) is connected to a DMX (Digital Multiplex) controller.

20. A method (600) for providing visual effects utilizing the arrangement (100, 200, 300, 400, 500) of claim 1, comprising providing a number of light emitting members, detecting a light pulse with at least one imaging means, processing and communicating location information data with said imaging means, receiving and processing the location information data with a computing unit, and controlling at least one laser projector with said computing unit based on the said received location information data and creating visual figures towards and/or in the vicinity of the light emitting members;

wherein the light emitting members are modulated with an individual frequency identified by said imaging means; and wherein the modulation includes a DC offset level keeping the light emitting members within the radiation intensity range in which the radiation is detected by said imaging means (106).

* * * * *